(12) United States Patent
Heath

(10) Patent No.: US 8,138,930 B1
(45) Date of Patent: Mar. 20, 2012

(54) ADVERTISING BASED ON ENVIRONMENTAL CONDITIONS

(75) Inventor: Taliver Brooks Heath, Mountain View, CA (US)

(73) Assignee: Google Inc., Mountain View, CA (US)

( * ) Notice: Subject to any disclaimer, the term of this patent is extended or adjusted under 35 U.S.C. 154(b) by 598 days.

(21) Appl. No.: 12/017,613

(22) Filed: Jan. 22, 2008

(51) Int. Cl.
*G01W 1/00* (2006.01)

(52) U.S. Cl. .................. 340/601; 340/540; 455/456.3; 705/14.21

(58) Field of Classification Search .................. 340/601, 340/540, 500; 705/14.21, 14.4, 1.1, 14.41, 705/14.42; 455/456.3
See application file for complete search history.

(56) References Cited

U.S. PATENT DOCUMENTS

| | | | |
|---|---|---|---|
| 6,912,532 B2 * | 6/2005 | Andersen .................. 707/999.01 |
| 7,512,603 B1 * | 3/2009 | Veteska et al. ......... 707/999.006 |
| 7,526,539 B1 | 4/2009 | Hsu |
| 2002/0101993 A1 | 8/2002 | Eskin |
| 2004/0044574 A1 * | 3/2004 | Cochran et al. .................. 705/14 |
| 2004/0073482 A1 | 4/2004 | Wiggins et al. |
| 2004/0162760 A1 * | 8/2004 | Seet et al. ........................ 705/14 |
| 2005/0228797 A1 | 10/2005 | Koningstein et al. |
| 2006/0287913 A1 * | 12/2006 | Baluja ............................ 705/14 |
| 2007/0005524 A1 * | 1/2007 | Iwachin .......................... 706/15 |
| 2007/0073841 A1 | 3/2007 | Ryan et al. |
| 2007/0083408 A1 | 4/2007 | Altberg et al. |
| 2007/0208591 A1 | 9/2007 | Glenn et al. |
| 2007/0260989 A1 | 11/2007 | Vakil et al. |
| 2008/0046311 A1 | 2/2008 | Shahine et al. |
| 2008/0109317 A1 * | 5/2008 | Singh .............................. 705/14 |
| 2008/0146892 A1 | 6/2008 | LeBoeuf et al. |
| 2008/0147488 A1 * | 6/2008 | Tunick et al. ................... 705/10 |
| 2009/0149199 A1 * | 6/2009 | Maghoul .................... 455/456.3 |
| 2010/0036717 A1 | 2/2010 | Trest |
| 2011/0119137 A1 | 5/2011 | Morsa |

FOREIGN PATENT DOCUMENTS

JP 2002/056273 2/2002

OTHER PUBLICATIONS

Feder, Barnaby "Billboards That Know You by Name" [online], New York Times, Jan. 29, 2007 [retrieved on 2009-xx-xx]. Retrieved from Internet <URL: http://www.nytimes.com/2007/01/29/business/media/29cooper.html?_r=2&oref=slogin&pagewanted=print>.
USPTO Office Action for U.S. Appl. No. 12/017,597, dated Sep. 28, 2010.
Response to Office Action for U.S. Appl. No. 12/017,597, filed with the USPTO on Jan. 26, 2011.
Office Action from U.S. Appl. No. 12/017,597, dated Apr. 15, 2011.
Response to Office Action from U.S. Appl. No. 12/017,597, filed with the USPTO on Jul. 8, 2011.
Office Action from U.S. Appl. No. 12/017,597, dated Aug. 29, 2011.

\* cited by examiner

*Primary Examiner* — Eric M Blount
(74) *Attorney, Agent, or Firm* — Fish & Richardson P.C.

(57) ABSTRACT

Information about an environmental condition of a remote device is received, the environmental condition being determined based on a signal output from a sensor of the remote device or a sensor coupled to the remote device. An advertisement is identified based on the environmental condition, and the advertisement is provided to the remote device.

23 Claims, 12 Drawing Sheets

ADVERTISING BASED ON ENVIRONMENTAL CONDITIONS

RELATED APPLICATIONS

This application is related to U.S. patent application Ser. No. 12/017,597, titled "ADVERTISING BASED ON ENVIRONMENTAL CONDITIONS", filed concurrently with this application, the contents of which are incorporated herein by reference.

TECHNICAL FIELD

This document generally relates to information management.

BACKGROUND

On-line advertisements allow advertisers to reach a wide range of viewers through the Internet. The selection of advertisements for display, such as with search results and other information, and the ordering of those advertisements, may be achieved by various techniques. In one example, an initial determination is made to identify all advertisements that are a match or near match for the applied search terms or other query items or information. The match may be made, for example, between one or more words in a query, and key words identified by an advertiser and associated with a particular advertisement or group of advertisements, such as a campaign. For example, a company selling fishing tackle may have a line of large lures, and may thus identify terms such as "lunker," "sturgeon," and "muskie fever" as keywords to associate with their advertisements for such large lures. Those advertisements may then be considered by the system for display when a search results are displayed to a user who enters such terms. The comparison may also be made between a search or query, and the text in an advertisement or the text in a target of a hyperlink in an advertisement, or to a combination of keywords, target text, and advertisement text, among other possible techniques. For example, the system may effectively select terms from an advertisement as key words so that the advertisement is selected for possible display when a search or other user action associated with the key words is submitted. An advertisement may be selected for possible display if there is a "near" match also, for example, if a query includes terms that are known synonyms or mistypings/misspellings of the key word terms for an advertisement.

SUMMARY

This document describes a system for allowing advertisers to target on-line advertisements based on environmental factors of end users. When determining what ads to serve to end users, the environmental factors can be used independently or in combination with matching of keywords associated with the advertisements and keywords in user search queries. A web browser or search engine located at the user's site may obtain information on the environment (e.g., temperature, humidity, light, sound, air composition) from sensors. Advertisers may specify that the ads are shown to users whose environmental conditions meet certain criteria. For example, advertisements for air conditioners can be sent to users located at regions having temperatures above a first threshold, while advertisements for winter overcoats can be sent to users located at regions having temperatures below a second threshold.

In general, in one aspect, information about an environmental condition of a remote user who is accessing a network is received at a server, an advertisement based on the environmental condition is identified at the server, the information about the environmental condition being derived from an output of a sensor located at the remote user, and the advertisement is provided to the user through the network.

Implementations may include one or more of the following features. The sensor can include an environmental sensor that provides information about the environmental condition. The sensor can be part of or coupled to a machine used by the user for accessing the network. At the server, the advertisement can be identified from among a plurality of advertisements by matching an environmental condition associated with the advertisement with the environmental condition of the user. The environmental condition can include at least one of temperature, humidity, sound, light, air composition, location, and speed of movement. The environmental condition can include at least one of soil, crop, or livestock conditions. The advertisement can be associated with a predetermined temperature condition, and the server can provide the advertisement to the user when the temperature at the user's site or at a geographical location of the user meets the predetermined temperature condition. The advertisement can be associated with a predetermined sound level condition, and the server provides the advertisement to the user when the ambient sound level at the user's site meets the predetermined sound level condition.

A keyword query can be received from the user, the keyword query including one or more keywords, wherein the advertisement provided by the server is associated with the one or more keywords. Traffic condition of the user can be determined based on the information about the environmental condition, and the advertisement can be provided based on the traffic condition. Receiving information about the environmental condition can include identifying a geographical location of the user based on the sensor output, and receiving information about the environmental condition of the geographical location. Identifying the geographical location of the user can include identifying the geographical location of the user based on data from a global positioning system sensor or by signal triangulation.

In general, in another aspect, at a server, a request for information from a remote user accessing a network is received, a location of the remote user is determined without using location information stored in a pre-established user profile, an environmental condition of the remote user is determined based on the location of the remote user, and an advertisement is identified based on the environmental condition. The requested information and the advertisement are provided from the server to the remote user through the network.

Implementations may include one or more of the following features. The network can include a mobile phone network having base stations, and determining the location of the remote user can include determining the location of the remote user using information provided by a base station that receives signals from the remote user. The request from the remote user can include a request for information. The request for information can include a request for phone directory information. The request for information can include a request for a document.

In general, in another aspect, from a client device, information about an environmental condition of a user of the client device who is accessing a network is provided to a remote server, and an advertisement that is identified at the server based on the environmental condition is received at the client device. At the client device, the advertisement is presented to the user.

Implementations may include one or more of the following features. Providing to a remote server information about an environmental condition can include providing to the remote server information about an environmental condition that is derived from an output of a sensor of the client device or a sensor coupled to the client device. The environmental condition can include temperature, humidity, sound, light, air composition, location, or speed of movement. A keyword query can be provided from the user to the server, the keyword query including one or more keywords, wherein the advertisement provided by the server can be associated with the one or more keywords. Traffic condition of the user can be provided based on the information about the environmental condition and advertisement that is identified based on the traffic condition can be received.

In general, in another aspect, information about an environmental condition of a remote device is received, the environmental condition being determined based on a signal output from a sensor of the remote device or a sensor coupled to the remote device; an advertisement is identified based on the environmental condition; and the advertisement is provided to the remote device.

Implementations may include one or more of the following features. An audio, image, or video signal can be received from the sensor and the environmental condition can be determined based on the audio, image, or video signal, respectively. An audio signal that includes a voice instruction from a user of the remote device can be received, and the environmental condition can be determined based on background sounds in the audio signal. Information in addition to the advertisement can be provided to the user based on the voice instruction of the user. The remote device can include a mobile phone. The remote device can include a mobile phone, personal computer, digital billboard, a digital kiosk, or a vendor machine, and providing the advertisement to the remote device can include providing a visual advertisement for displaying on a display of the mobile phone, personal computer, digital billboard, digital kiosk, or vending machine, respectively. The remote device can include a mobile phone, personal computer, digital billboard, a digital kiosk, a vending machine, or a public address system, and providing the advertisement to the remote device can include providing an audio advertisement for playing through an audio output of the mobile phone, personal computer, digital billboard, digital kiosk, vending machine, or public address system, respectively. An event can be identified based on the signal output from the sensor. The event can include at least one of a sports event or a musical event. Identifying an advertisement based on the environmental condition can include identifying an advertisement based on the event. The remote device can be placed in a public environment and be shared by a plurality of people. Information in addition to the advertisement can be provided from the remote device to the user. Providing information can include providing at least one of text, audio, or video information.

In general, in another aspect, content is displayed on a digital billboard laced in a public environment; a sensor of the display or a sensor coupled to the display senses an environmental condition; the environmental condition is sent to a server; an advertisement is received from the server, the advertisement being identified by the server based on the environmental condition; and the advertisement is displayed on the digital billboard.

Implementations may include one or more of the following features. Sensing the environmental condition can include sensing at least one of temperature, humidity, sound, light, or air composition. The digital billboard can be installed at an indoor location, and sensing the environmental condition can include sensing an indoor or outdoor environmental condition.

In general, in another aspect, information is broadcast through a public address system; a sensor of the public address system or a sensor coupled to the public address system is used to sense an environmental condition; the environmental condition is sent to a server; an advertisement is received from the server, the advertisement being identified by the server based on the environmental condition; and the advertisement is broadcast through the public address system.

In general, in another aspect, a computer-implemented method includes enabling advertisers to associate advertisements with one or more environmental conditions to allow the advertisements to be provided to users whose environmental conditions match the environmental conditions associated with the advertisements; and enabling the advertisers to bid for environmental conditions associated with one or more keywords.

Implementations may include one or more of the following features. The method can include providing a user interface to allow the advertiser to associate the advertisement with the environmental condition, the user interface allowing the advertiser to bid for environmental conditions associated with one or more keywords. The environmental condition can include at least one of temperature, humidity, sound, light, air composition, location, and speed of movement.

In general, in another aspect, a computer implemented method includes enabling a sponsor to configure an ad campaign based on criteria that include environmental conditions; receiving information about environmental conditions; and dynamically adjusting the ad campaign based on the environmental conditions.

Implementations may include one or more of the following features. Enabling a sponsor to configure an ad campaign can include enabling the sponsor to allocate ad budgets based on the environmental conditions. Enabling the sponsor to allocate ad budgets based on the environmental conditions can include enabling at least one of (a) adjusting allocation of ad budgets for different types of media, (b) adjusting bid amounts of ads for different types of media, (c) adjusting allocation of ad budgets for different products, or (d) adjusting bid amounts of ads for different products based on the environmental conditions.

In general, in another aspect, an apparatus includes a storage device to store advertisements each associated with an environmental condition; and a server to receive information about an environmental condition of a remote user who is accessing a network, the information about the environmental condition being derived from an output of a sensor located at the remote user, identify an advertisement based on the environmental condition, and provide the advertisement to the user.

Implementations may include one or more of the following features. The server can identify the advertisement from among a plurality of advertisements by matching an environmental condition associated with the advertisement with the environmental condition of the user. The server can identify a geographical location of the user based on the sensor output and receive information about the environmental condition of the geographical location.

In general, in another aspect, an apparatus includes a storage device to store advertisements each associated with an environmental condition; and a server to receive a request for information from a remote user accessing a network, determine a location of the remote user without using location information stored in a pre-established user profile, determine an environmental condition of the remote user based on the location of the remote user, identify an advertisement based on the environmental condition, and provide the requested information and the advertisement to the remote user through the network.

Implementations may include one or more of the following features. The server can include a mobile phone server.

In general, in another aspect, an apparatus includes a graphical user interface to enable advertisers to associate advertisements with one or more environmental conditions to allow the advertisements to be provided to users whose environmental conditions match the environmental conditions associated with the advertisements. The graphical user interface enables the advertisers to bid for environmental conditions associated with one or more keywords.

Implementations may include one or more of the following features. The environmental condition includes temperature, humidity, sound, light, air composition, location, and/or speed of movement.

In general, in another aspect, an apparatus includes a device having a user interface to provide information to a user; and a sensor to sense a parameter and generate an output signal. The device is configured to provide the output signal to a remote server, receive an advertisement identified by the remote server based on an environmental condition determined according to the output signal of the sensor, and provide the advertisement in addition to the information to the user.

Implementations may include one or more of the following features. The sensor can include an audio, image, or video sensor. The device can include at least one of a visual or audio user interface. The device can include a mobile phone, a digital billboard, a digital kiosk, or a vending machine, and can be configured to receive visual advertisements from the remote server and show the advertisements on a display of the mobile phone, the digital billboard, the digital kiosk, or the vending machine. The remote device can include a mobile phone, a digital billboard, a digital kiosk, a vending machine, or a public address system, and providing the advertisement to the remote device can include providing an audio advertisement for playing through an audio output of the mobile phone, digital billboard, digital kiosk, vending machine, or public address system, respectively. The sensor can sense temperature, humidity, sound, light, or air composition.

In general, in another aspect, a system includes means for receiving information about an environmental condition of a remote user who is accessing a network, the information about the environmental condition being derived from an output of a sensor located at the remote user; means for identifying an advertisement based on the environmental condition; and means for providing the advertisement to the user through the network.

These and other aspects and features, and combinations of them, may be expressed as methods, apparatus, systems, means for performing functions, program products, and in other ways.

The systems and methods disclosed herein may have one or more of the following advantages. By providing ads that are selected based in part on environmental conditions, more relevant ads may be shown to users, providing a better user experience. More relevant ads can be served to users, increasing the likelihood of the ads being clicked on or acted upon, increasing the effectiveness of the ads.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
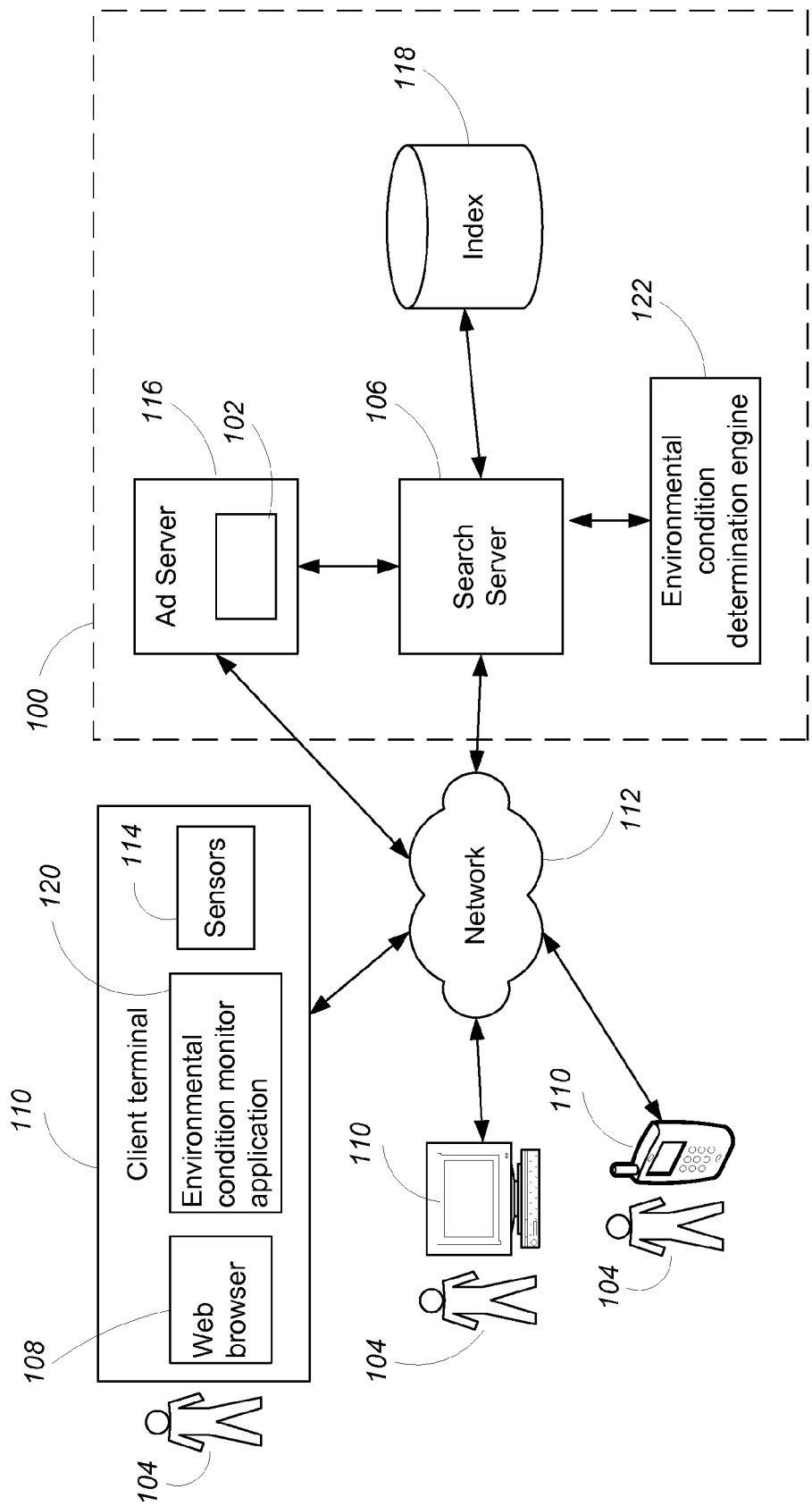
FIG. 1 is a schematic diagram of an information retrieval system.

Referring to FIG. 1, an exemplary information retrieval system 100 retrieves and provides information (e.g., web documents) and content 102 (e.g., advertisements or simply ads) that match search queries submitted by remote users 104. The system 100 includes a search server 106 that enables the users 104 to search for information using, for example, a keyword search. The system 100 is configured to receive information about environmental conditions of the remote users 104, use the environmental conditions as one of the criteria for identifying ads 102, and provide the ads 102 to the users 104. Sponsors of the ads 102 generate higher revenue when their ads are clicked on or acted upon. By using environmental conditions of the users 104 as one of the criteria for selecting ads 102, more relevant ads 102 can be served to the users 104, increasing the likelihood of the ads 102 being clicked on or acted upon.

The content 102 is not limited to advertisements, and can include various types of information useful to the users 104, such as weather and traffic information.

The user 104 may use a web browser 108 executing on a client terminal 110 (e.g., personal computer, personal digital assistant, mobile phone, media player, in-vehicle terminal) to access the search server 106 through a network 112 (e.g., Internet). One or more sensors 114 provide information about environmental conditions of the user 104. The sensors 114 can be configured to sense, for example, temperature, humidity, sound, light, and/or air composition. Sensing air composition may including sensing odors, smog, dust, pollen, pollutant, or other particles or molecules in the air. The sensors 114 can include a digital camera to obtain images of the environment. The sensors 114 can include a positioning sensor, such as a global positioning system (GPS) sensor, that provides location information. The location information can be used to access services (e.g., weather channel websites) that provide environmental conditions of a given location. Location information can also be inferred from other means. For example, the client terminal 110 can be a cell phone, and location information can be derived from information about base stations that the cell phone is connected to.

The sensors 114 can be integrated with the client terminal 110. The sensors 114 can also include a stand-alone device that is connected to the client terminal 110 through a wired or wireless connection, such as a USB (universal serial bus), Bluetooth®, radio frequency, or infrared link.

An environmental condition monitor application 120 is executed on the client terminal 110 for processing data generated by the environmental sensors 114. For example, the environmental condition monitor application 120 may process audio signals from an audio sensor and filter sporadic signals to determine a long term ambient noise level. The environmental condition monitor application 120 may process temperature signals from a temperature sensor to detect a temperature pattern, such as an average temperature above a certain level for a number of hours per day for a number of days. The environmental condition monitor application 120 may process ambient light signals from an ambient light sensor to detect an ambient light pattern, such as an average ambient brightness above a certain level for a number of hours per day for a number of days.

The environmental condition monitor application 120 may also access, through the network 112, services that provide information about general environmental conditions at the geographical region where the user 104 is located. The environmental condition monitor application 120 may request the user 104 to input address information during a setup process. The environmental condition monitor application 120 may access a weather service, a pollution alert, and an allergy alert to obtain information about local weather (e.g., outdoor temperature), pollution, and allergy conditions.

The environmental condition monitor application 120 may share the sensors 114 with other applications. For example, the sensors 114 can include a microphone of a personal computer or a mobile phone that is used in speech recognition, phone calling, or video conferencing applications. The microphone can also be used by the environmental condition monitor application 120 for sensing ambient noise. The sensors 114 can include a light sensor of a display of the client terminal 110 for sensing ambient light to determine the brightness of the display. The light sensor can also be used by the environmental condition monitor application 120 for sensing ambient light to determine a likelihood that the user 104 is in an indoor or outdoor environment.

It is important to respect the privacy of the users 104. The environmental condition monitor application 120 may provide the user 104 with options of enabling or disabling some or all of the sensors 114 for the purpose of gathering information to support advertisements. A privacy policy may be provided to the user 104 to specify what information is gathered and how the information is used. The user 104 can turn off the environmental condition monitor application 120 to prevent any information about the environmental condition from being gathered.

The web browser 108 is configured to receive information from the environmental condition monitor application 120. When the user 104 accesses the search server 106 to search for information, the web browser 108 sends a search request that includes a search query and information about the environmental conditions of the user 104 to the search server 106. The search query may include one or more search terms (e.g., keywords or key phrases). In response, the search server 106 searches an index 118, returns a list of documents (e.g., web pages) having keywords that match the search query submitted by the user 104, and provides the list of documents in a sequence according to rank scores of the documents. The search server 106 may also cause ads 102 to be displayed alongside the list of returned documents. The ads 102 may be provided by an ad server 116 that selects the ads 102 based on the keywords and environmental conditions.

The search server 106 sends the keywords in the user's search query and information about the environmental conditions of the user 104 to the ad server 116. The ad server 116 selects ads 102 based on several criteria. One criterion is how close the keywords associated with the ads 102 match the keywords in the user's search query. Another criterion is how close the environmental conditions of the user 104 match the environmental conditions associated with the ads 102. The ad server 116 selects a list of ads ranked according to the criteria specified above and sends the list of ads to the search server 106. The search server 106 sends the search results and the ads 106 to the user 104. Some ads, such as video ads, may require the web browser 108 to connect to the ad server 116 to stream data (e.g., video) from the ad server 116.

When advertisers or sponsors provide the ads 102 to the system 100, the advertisers may specify the environmental conditions that are relevant to the ads 102. For example, a seller of air conditioners may specify that an ad 102 for air conditioners should be sent to users 104 who are searching for information about air conditioners and are situated in environments where the temperatures sensed by the sensors 114 are above a preset level (e.g., 80° F.). When a user 104 searches for information about air conditioners and is situated in a high temperature environment, there is a high likelihood that the user 104 may be interested in purchasing an air conditioner in the near future.

The advertiser may specify that the air conditioner ad be served to a user 104 located in a geographical region (e.g., city) where the outdoor temperature is above a preset level (e.g., 80° F.). The advertiser may specify that the air conditioner ad should not be served to a user 104 located in an environment where the room temperature as sensed by the sensors 114 is below a first preset level (e.g., 75° F.) and the outdoor temperature is above a second preset level (e.g., 80° F.). This may indicate that the user 104 is already in an air conditioned environment (or otherwise cool environment, such as the basement) where air conditioners are not needed.

In order for the air conditioner ad 102 to reach a wide audience, the advertiser may specify that a percentage of the ad budget is used to serve the ad 102 to users 104 who search for information about air conditioners regardless of their environmental conditions, a percentage of the ad budget is used to serve the ad 102 to users 104 who search for information about air conditioners and are in high temperature environments, and a percentage of the ad budget is used to serve the ad 102 to users 104 who are in high temperature environments regardless of the information being sought by the users 104.

Similarly, a seller of heaters may specify that an ad 102 for heaters be served to users 104 who are searching for information about heaters and situated in environments that meet certain temperature conditions. Ads 102 for winter overcoats can be sent to users 104 located at regions having temperatures below a threshold. Ads 102 for humidifiers can be sent to users 104 situated in a humid environment. A seller of beers may specify that ads 102 showing cool beers be sent to users 104 in high temperature environments. A restaurant serving hot pots may specify that ads 102 showing hot pots be sent to users 104 in low temperature environments.

For example, a seller of noise canceling headphones may specify that an ad 102 for noise canceling headphones be served to a user 104 located in an environment where the ambient noise is above a preset level (e.g., 70 dB). The advertiser may specify that the ambient noise level be above the preset level for more than a preset period of time (e.g., noisy levels detected for at least one hour per day for at least two consecutive days).

In some examples, the user 104 may sign up for a service provided by a service provider, in which provision of the service requires information from the sensors 114. For example, a farmer may use sensors 114 to sense soil, crop, and livestock conditions on a farm. The data from the sensors may be sent to a service provider that remotely diagnose and monitor health conditions of the crops and livestock. The sensors 114 may be provided to the farmer at a subsidized cost in exchange for the farmer agreeing to receive ads 102 that are delivered to a terminal on the farm based on data feed from the sensors 114. The data from the sensors 114 may be used to target ads 102 from sellers of seeds, fertilizers, feedstock, pesticides, farm machinery, or any other potential supplier of the farm.

In some examples, location information obtained from the sensors 114 can be used to infer that the user 104 is waiting in a traffic jam. For example, the location information may indicate that the user 104 is located on a highway and moving very slowly. Links to websites having information about mass transit and/or car pooling may be provided to the user 104. Location information may be used to infer that an earthquake has recently occurred in the geographical region where the user 104 is located. Ads 102 for structural engineers may be provided to the user 104.

Location information obtained from the sensors 114 can be used to infer a change of weather conditions at the locations of the users 104, and relevant ads 102 or announcements may be sent to the users 104. Various examples are given below. During seasonal changes, ads for outerwear suitable for the user's location may be provided to the user 104. Ads 102 for light jackets may be provided to users 104 located in regions with mild winters, and ads 102 for heavy overcoats and snow boots may be provided to users 104 in regions with severe winters. Near the start of winter season, ads 102 for snow blowers may be provided to users 104 located at geographical regions where heavy snowfalls occur.

In some implementations, the system 100 may provide business listing search service, e.g., Google Voice Local Search. The client terminal 110 can be a cell phone that includes sensors 114 such as a digital camera, a microphone, and a position sensor (e.g., a GPS sensor). When the user 104 calls 1-800-GOOG-411, the system 100 provides business listing information according to user request. The system 100 may also provide ads that are selected based on information obtained from one or more sensors 114, such as images of ambient environment, ambient noise, and location information.

For example, the user 104 may be in a sports stadium and calling GOOG-411 for information about a nearby restaurant. The cheering of crowds and announcements made during the sports event may be picked up by the cell phone microphone. The system 100 may be able to determine the type of sports event based on the background noise. If location information is available, the system 100 may compare the location information with locations of known sports events and determine which sports event the user 104 is attending. Ads that may be of interest to fans of the sports event may be served to the user 104. For example, links to websites that provide sports news and statistics may be provided to the caller 104.

Similarly, when a user 104 calls GOOG-411 for information about a nearby restaurant before a concert or during intermission, the tuning of instruments during the pre-concert or intermission period may be picked up by the cell phone microphone. If location information is available, the system 100 may compare the location information with locations of known musical events and determine which musical event the user 104 is attending. While GPS information may not be available indoors, such as in a music hall, the cell phone may store the last available GPS data prior to entering the music hall, and the GPS data can be provided to the system 100. Alternatively, location information can be inferred by cell phone signal triangulation. Ads that may be of interest to fans of the musical event may be served to the user 104. For example, links to websites that provide news of musicians, or ads of albums, instruments, or audio equipment may be provided to the caller 104.

When a user 104 is at a train or subway station, the background noise may include announcements of arriving or departing trains that can be used to infer the location of the user 104.

As discussed above, the client terminal 110 has privacy protection features and allows the user 104 to enable or disable some or all of the sensors 114 for the purpose of gathering information to support advertisements.

A feature of the system 100 is that it can deliver advertisements that target individual users 104 based on environmental conditions of the individual users. For example, one user may live next to a busy street and more likely to be interested in receiving ads for noise canceling headphones than another user located on a quiet cul-de-sac a few blocks away. One user may have a damp basement and more likely to be interested in receiving ads for dehumidifiers, while another user located nearby may live in a house where dampness is not a problem. The interests of users inside a stadium may be different from the interests of users outside of the stadium. Compared to ads delivered through broadcast systems and received through radios or televisions, the on-line ads delivered by the system 100 can more closely match the interests of the users 104.

The system 100 includes an environmental condition determination engine 122 that determines general environmental conditions of the user 104 based on information about the user 104 that is not obtained by the sensors 114. For example, the environmental condition determination engine 122 can be used when the client terminal 110 does not have relevant sensors 114, when the environmental condition monitor application 120 is not installed on the client terminal 110, or when the environmental condition monitor application 120 is turned off by the user 104. For example, when a user 104 accesses the search server 106, the system 100 may be able to derive the location of the user 104 based on an Internet Protocol (IP) address of the client terminal 110. The client terminal 110 may send location information (e.g., obtained from a GPS sensor) to the search server 106. The environmental condition determination engine 122 obtains information about general environmental conditions of the user 104 based on the user's location using, for example, services that provide weather, pollution, or allergy conditions.

In some examples, the system 100 may provide a service (e.g., e-mail service) that requires registration. The users 104 provide residence address information as part of the registration process. When a user 104 accesses the service, the environmental condition determination engine 122 determines the general environmental conditions (e.g., weather, air pollution, allergy conditions, etc.) of the user 104 based on the registered residence address. Information about the general environmental conditions can be used by the ad server 116 in selecting ads to be served to the user 104.

Figure 2:
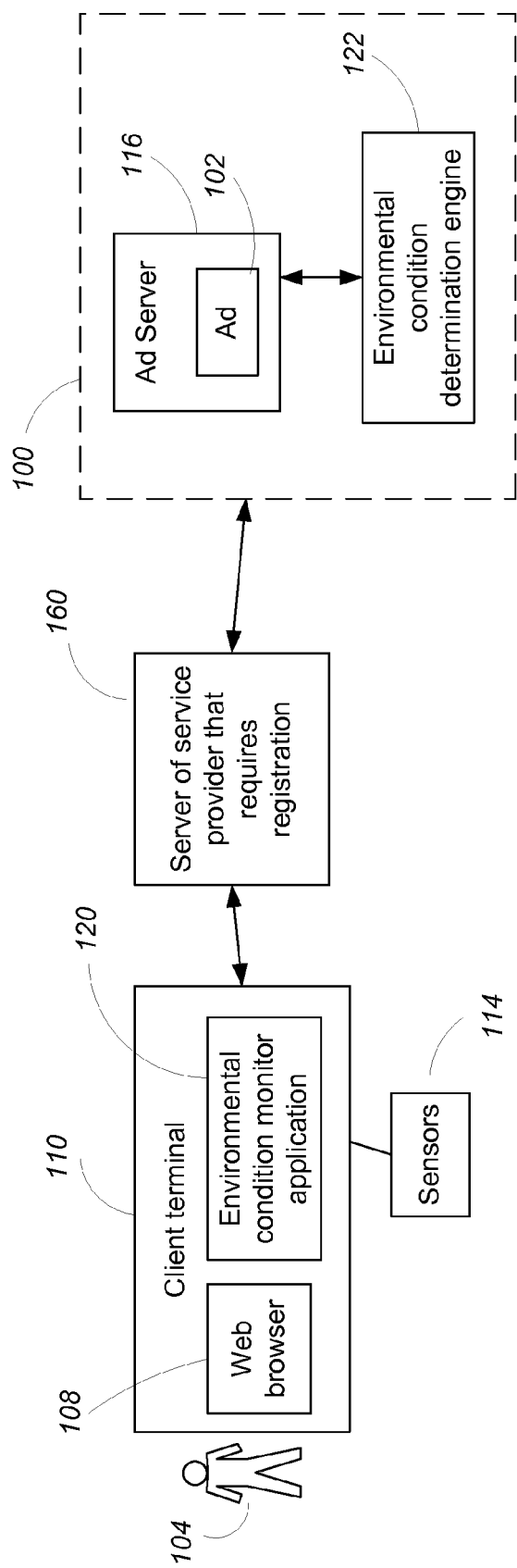
FIGS. 2 and 3 are diagrams of a system for providing information to users.

Referring to FIG. 2, in some implementations, users 104 access a server 160 of a third party service provider to request information. The service provider can be, e.g., a publisher of premium content, such as financial news and analyses. The service provider can be a member of an ad network that delivers ads served by the ad server 116. When users 104 sign up for services provided by the service provider, the users 104 provide residence addresses as part of the registration process.

When a user 104 uses the web browser 108 to access the service provided by the server 160, the web browser 108 may forward information about environmental conditions (received from the environmental condition monitor application 120) to the server 160. The server 160 forwards the environmental condition information to the system 100. The server 160 also sends information about the user 104, such as the user's residence address, to the system 100. The environmental condition determination engine 122 determines the general environmental conditions of the user 104 based on the information about the user, such as the user's residence address. Information about the user's environmental conditions provided by the environmental condition monitor application 120 and the environmental condition determination engine 122 can be used by the ad server 116 in selecting ads to be served to the server 160. The server 160 delivers requested information and the ads to the user 104.

In some examples, the client machine 110 can be placed in a public location and viewed or accessed by several users. For example, the client machine 110 can be a digital billboard, a digital kiosk, a vending machine, or a public address system that delivers advertisements selected based on environmental conditions.

Figure 3:
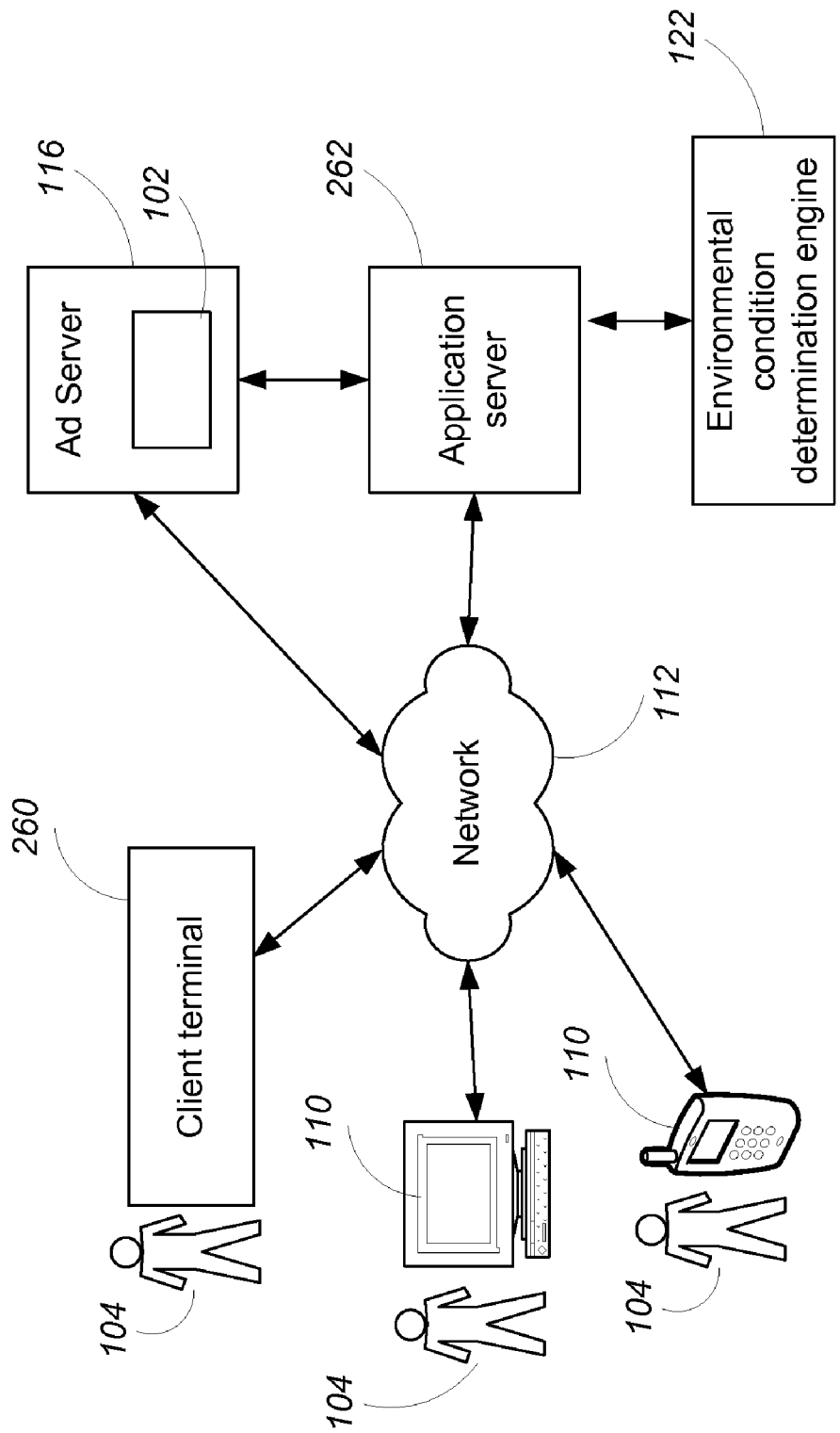

Referring to FIG. 3, a user 104 can use a client terminal 260 to access services provided by an application server 262, in which the application server 262 provides information and content items (e.g., ads) based on the environmental conditions of the user 104. The client terminal 260 does not necessarily execute a web browser 108 or an environmental condition monitor application 120. For example, the client terminal 260 can be a mobile phone 260.

In one implementation, when the user 104 uses the mobile phone 260 to access a service provided by an application server 262, the application server 262 determines a location of the user 104 using information obtained from mobile phone base stations that receive signals from the mobile phone 260. When the user 104 dials a number to request information, the application server 262 determines the location of the user 104, identifies environmental conditions (e.g., weather) at the user's location, and delivers the requested information and ads that are selected based on the environmental conditions. In some implementations, the application server 262 can infer the destination of the user 104, and select ads that are based on the environmental conditions of the destination.

For example, the application server 262 may provide a phone directory service, such as GOOG-411 service. As an example, when the user 104 dials GOOG-411 to look up information about a museum, if the application server 262 determines that the city where the user's located has a high temperature, the application sever 262 may provide the user 104 information about the museum and a message indicating, for example, there is an ice cream store nearby.

For example, the application server 262 can provide the user 104 information about the museum, then ask the user 104 whether he/she is interested in hearing information about other local businesses or attractions. If the user 104 expresses interest in receiving additional information, the application server 262 can identify the businesses in the vicinity of the user and provide information about those businesses in a sequence determined based on criteria that include environmental conditions.

The information provided by the application server 262 to the user 104 can be advertisements provided by advertisers or other information available to the application server 262. When providing a list of local attractions to the user 104, the application server 262 may take into account the environmental condition (e.g., local weather) when ranking the local attractions. For example, when the user 104 is asking about local attractions on rainy days, the application server 262 may rank indoor facilities (e.g., museums) higher than outdoor facilities (e.g., parks), and vice versa on sunny days.

Figure 4:
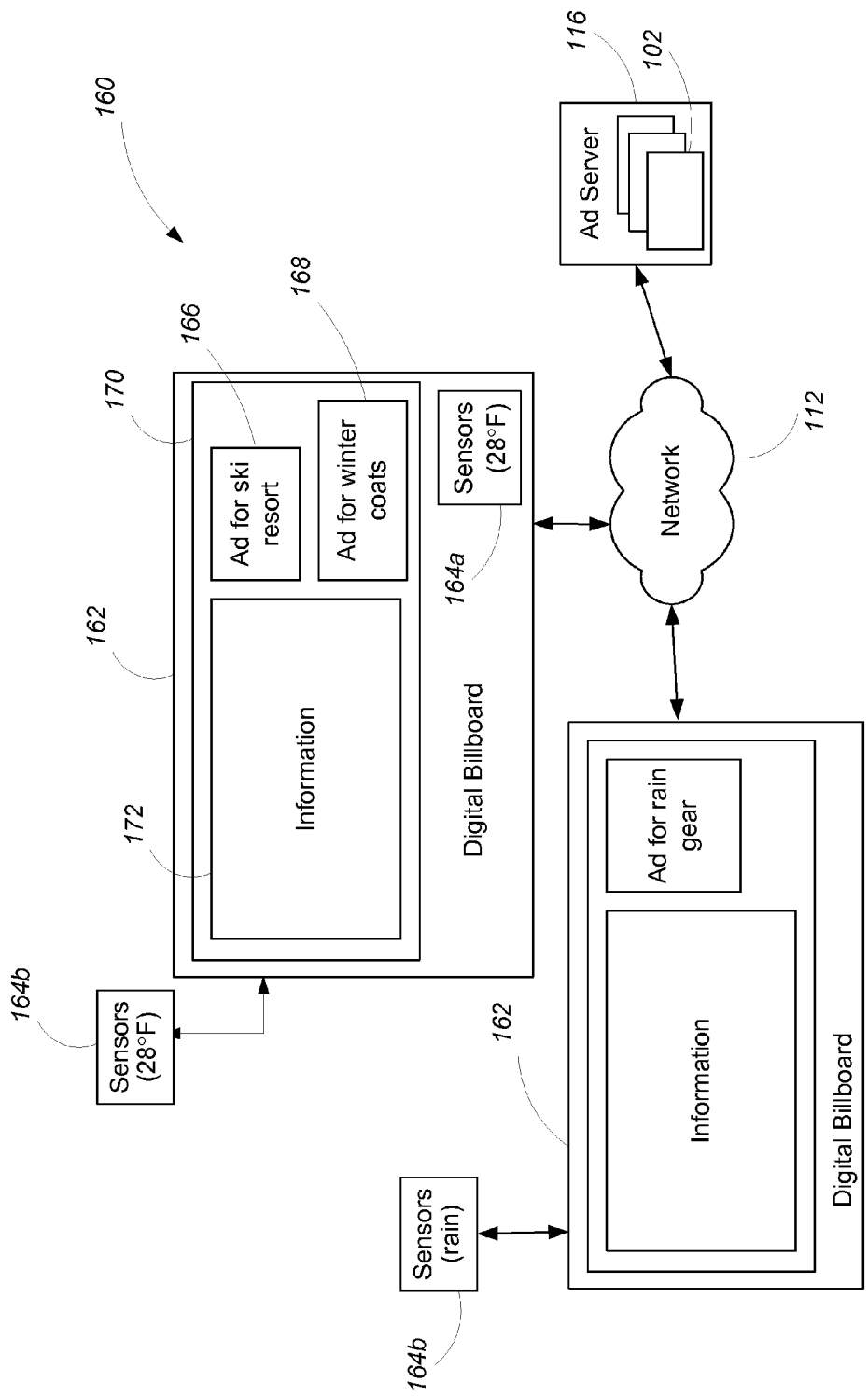
FIGS. 4 and 5 are diagrams of exemplary information delivery systems.

Referring to FIG. 4, an exemplary information delivery system 160 includes digital billboards 162 placed at public locations, such as train station platforms or pedestrian sidewalks. The digital billboard 162 has a display 170 that shows information 172, such as train schedules or other public announcements. The display 170 can also show advertisements. The digital billboard 162 has built-in sensors 164a and/or external sensors 164b (collectively referenced as 164). The sensors 164 may include, e.g., a temperature sensor, a humidity sensor, a rain gauge, and/or a snow gauge. The external sensors 164b can be placed at, for example, roof tops to allow sensing of rain and/or snow, and communicate with the digital billboard 162 using wired or wireless links.

Information about environmental conditions detected by the sensors 164 is sent through a network 112 to an ad server 116, which selects ads 102 according to the environmental conditions, e.g., in addition to other criteria. For example, during the winter season, when the temperature is below a preset value (e.g., 32° F.), the ad server 116 can deliver, e.g., ads for ski resorts 166 and ads for winter overcoats 168 to the digital billboard 162. During the summer season, when the temperature is above a preset value (e.g., 85° F.), the ad server 116 can deliver, e.g., ads for beach resorts or air conditioners to the digital billboard 162.

Ads that are delivered based on environmental conditions may be more effective than ads delivered without consideration of environmental conditions. For example, it may be more effective to show ads for winter coats on the digital billboard 162 on the first chilly day in late autumn or early winter when shoppers are starting to buy winter clothes than showing the ads on warmer days. It may be more effective to show ads for snow boots on the digital billboard 162 during the first day of snow accumulation. It may also be more effective to show ads for rain gear on the digital billboard 162 during rainy days than sunny days.

In some implementations, the system 160 may allow sponsors of ads to select various criteria for placement of ads, and the bidding price may vary depending on the selected criteria. For example, the system 160 may have several digital billboards at various locations across the country. The system 160 may allow sponsors of ads to specify particular days (e.g., ads shown on weekdays may be more expensive than ads shown on weekends), particular time slots within a day (e.g., rush hour time slots may be more expensive than non-rush hour time slots), particular locations (e.g., ads shown at major train stations may be more expensive than ads shown at small train stations), particular billboards within a location (e.g., a train station may have several digital billboards and ads shown on billboards located at higher traffic areas may be more expensive than ads shown on billboards located at lower traffic areas). The system may allow the sponsors to specify particular environmental conditions and time period after occurrence of particular environmental conditions. For example, ads for winter clothing shown on the first day of frost may be more expensive than similar ads shown a week later, and ads for air conditioners shown on the first day of occurrence of a heat wave may be more expensive than similar ads shown a week later.

For example, sponsors can bid for placement of ads at a particular digital billboard located at a particular major train station at a particular time slot during rush hour on weekdays. Sponsors can also bid for placement of ads at any one of a number of selected locations when certain environmental conditions are met (e.g., the temperature is below 32° F.).

In some implementations, the system 160 may provide a preset schedule for showing ads on the digital billboard 162, in which the preset schedule can be overridden when certain environmental conditions are met. For example, the billboard 162 can be configured to show a first ad A1 according to a regular schedule. If a predetermined environmental condition is met, the digital billboard 162 replaces the ad A1 with another ad A2 and provides a credit to the sponsor of the ad A1.

A feature of the system 160 is that it allows effective placement of ads for items that are associated with certain environmental conditions. For example, rather than spending money advertising a new line of winter coats on a large number of digital billboards across the country, it may be more cost effective to advertise on a smaller number of digital billboards when the local temperature is below a certain threshold. By providing ads that are selected based in part on environmental conditions, more relevant ads may be shown to the viewers of the digital billboard 162, providing a better user experience.

In some implementations, the system 160 includes digital billboards 164 located in shopping malls or walkways of strip malls. Stores in the shopping mall may sign up for display of ads on the digital billboard 164 based on environmental conditions. For example, a store selling rain gear may bid for placement of an ad on the digital billboard 164 when it is raining, a store selling winter coats, winter sports goods, or heaters may bid for placement of an ad when the outdoors temperature is below a preset value, and a store selling air conditioners or fans may bid for placement of an ad when the outdoors temperature is above a preset value.

Shopping malls and strip malls may be large and often shoppers do not have time to visit every store, or may not know the existence of certain stores. Shows ads on the digital billboard based on environmental conditions provides a way to attract the attention of shoppers when the shoppers are most likely to pay attention to the ads.

Figure 5:
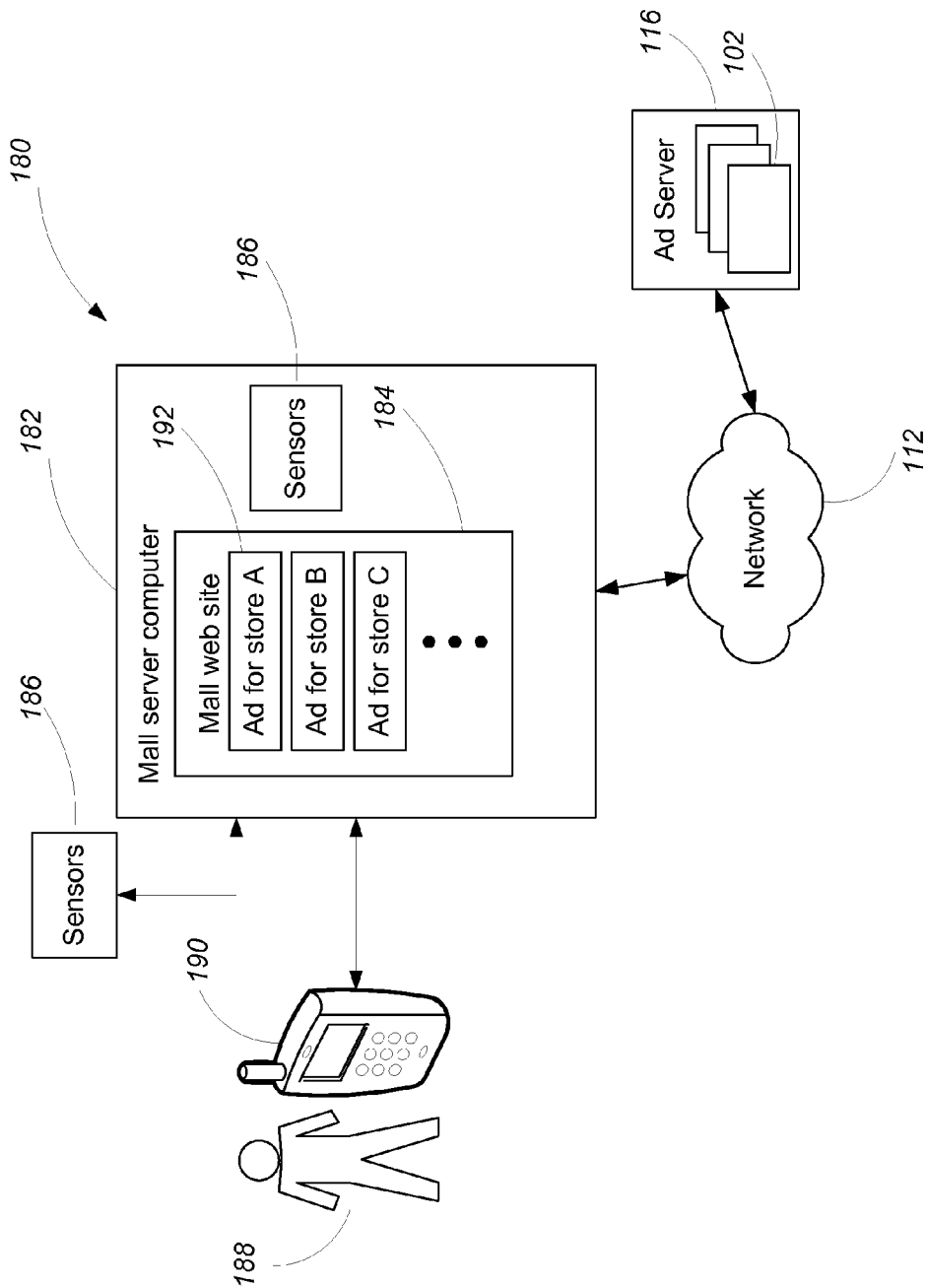

Referring to FIG. 5, an exemplary information delivery system 180 allows delivery of ads that are selected based on environmental conditions of a local region. For example, a shopping mall may have a wireless (e.g., Wi-Fi) network that allows shoppers 188 to use, e.g., mobile phones 190 to access a web site 184 hosted by a mall server computer 182. The shopping mall web site 184 may provide information about the stores in the mall, such as locations of the various stores and brief descriptions of the goods sold at the stores. The web site 184 may also display advertisements of the stores, in which the advertisements can be selected based on environmental conditions detected by sensors 186.

In some implementations, upon entering the shopping mall 182, a shopper 188 can use a mobile phone 190 to access the mall web site 184 and look up a list of ads 192 showing, e.g., stores having items on sale. Ads that are placed earlier in the list may be more expensive than those placed later in the list. Sponsors may bid different prices depending on environmental conditions. For example, a store selling winter coats may bid $x1 for placement of an ad on the list when the outdoors temperature is above a preset value, and bid $x2 when the outdoors temperature is below the preset value. By providing ads that are selected based in part on environmental conditions, more relevant ads may be shown to the shoppers 188, providing a better shopping experience.

In some implementations, a public address system may broadcast pre-schedules programs (e.g., background music or public announcements) and advertisements. The advertisements in the form of audio files may be selected dynamically by an ad server 116 according to environmental conditions and played during time slots allocated for advertisements.

Other than selecting ads based on the environmental conditions, the system can adjust ad campaigns based on environmental conditions. For example, an ad network may allow advertisers to deliver ads to different types of media, such as Internet, radio, television, and digital billboards. Ad consumption for different types of media may be different depending on environmental conditions.

For example, during cold and rainy days, people may spend more time indoors, whereas during warm and sunny days, people may spend more time outdoors. The system may provide the option to allow an advertiser to increase the percentage of ad budget or bid amount for delivering ads to outdoor digital billboards on warm and sunny days, and increase the percentage of ad budget or bid amount for delivering ads to indoor digital billboards on cold and rainy days. The system may provide the option to allow an advertiser to increase the ad budget or bid amount for Internet ads and television ads on cold and rainy days (perhaps on the assumption that more people will be staying home surfing the Internet or watching television) and decrease the ad budget or bid amount for Internet ads and television ads on warm and sunny days (perhaps on the assumption that more people will be enjoying outdoor activities).

Figure 6:
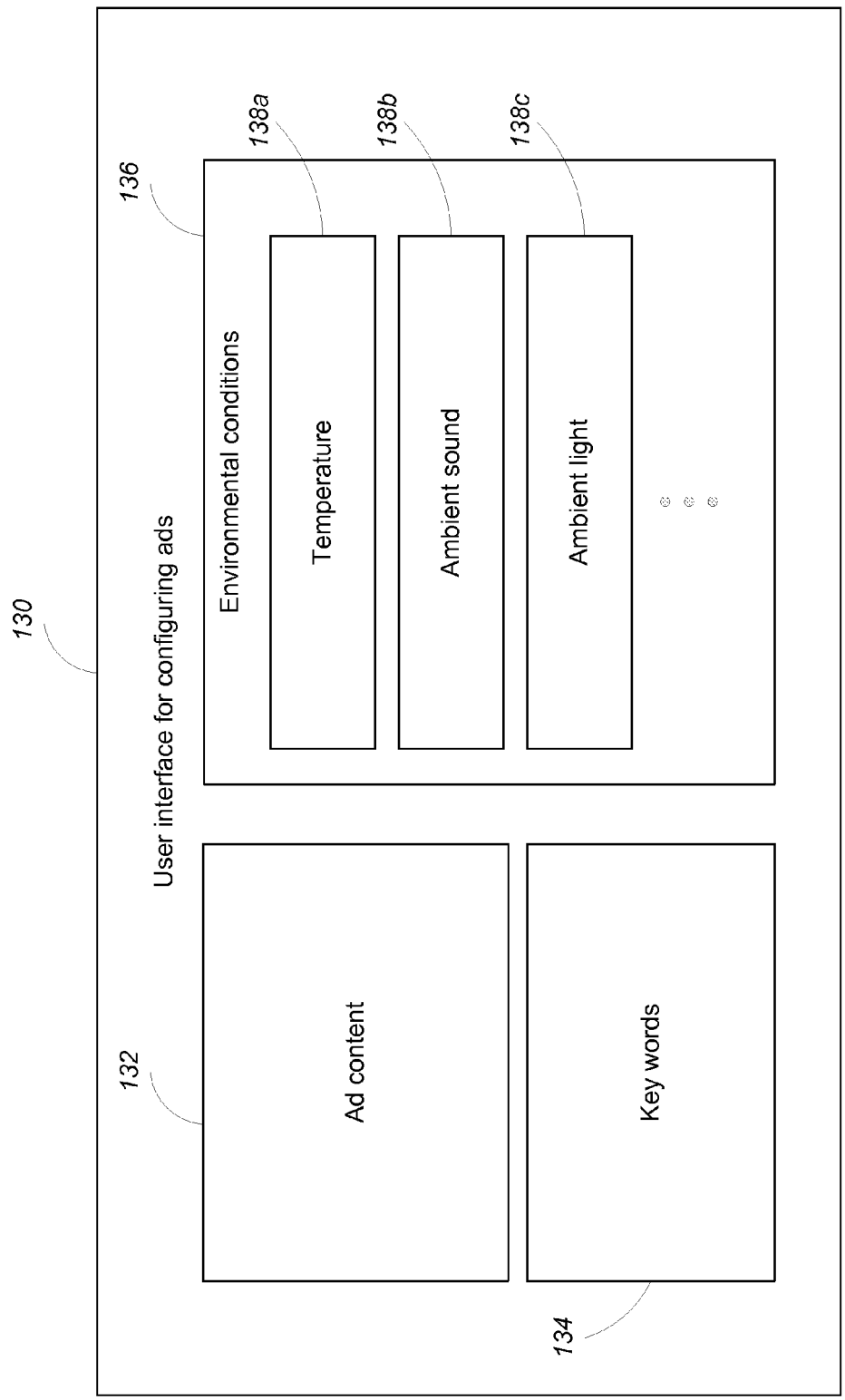
FIG. 6 is a diagram of a graphical user interface.

Referring to FIG. 6, an exemplary graphical user interface (GUI) 130 is provided to allow an advertiser to configure parameters associated with an ad 102. The GUI 130 includes an area 132 for showing the ad content that is displayed to the end user 104, an area 134 for configuring keywords associated with the ad 102, and an area 136 for specifying the environmental conditions associated with the ad 102. The area 136 include areas 138a, 138b, 138c for specifying temperature, ambient sound, and ambient light conditions, respectively. The area 138a allows the advertiser to specify conditions for room temperature and outdoor temperature. The GUI 130 can be used to configure other environmental conditions, or other parameters associated with the ad 102.

In some implementations, the GUI 130 may provide options to allow the advertiser to bid for different amounts depending on whether the ad 102 is delivered to users 104 based on environmental conditions. For example, the advertiser may specify a first price that he is willing to pay when an ad 102 for air conditioners is delivered to users 104 based on a matching of keywords alone, and a second price when the air conditioner ad 102 is delivered to users 104 based on a matching of keywords and environmental conditions.

In some implementations, the GUI 130 may provide options to allow the advertiser to bid for different amounts depending on time periods after occurrence of certain environmental conditions. For example, an advertiser may specify a formula $F1(t)$ for the price that he is willing to pay for delivery of an ad 102 for winter overcoats, where t is the time from the morning of the first day of frost, or specify a formula $F2(t)$ for the price for delivery of an ad 102 for air conditioners, where t is the time from the occurrence of a heat wave.

Figure 7:
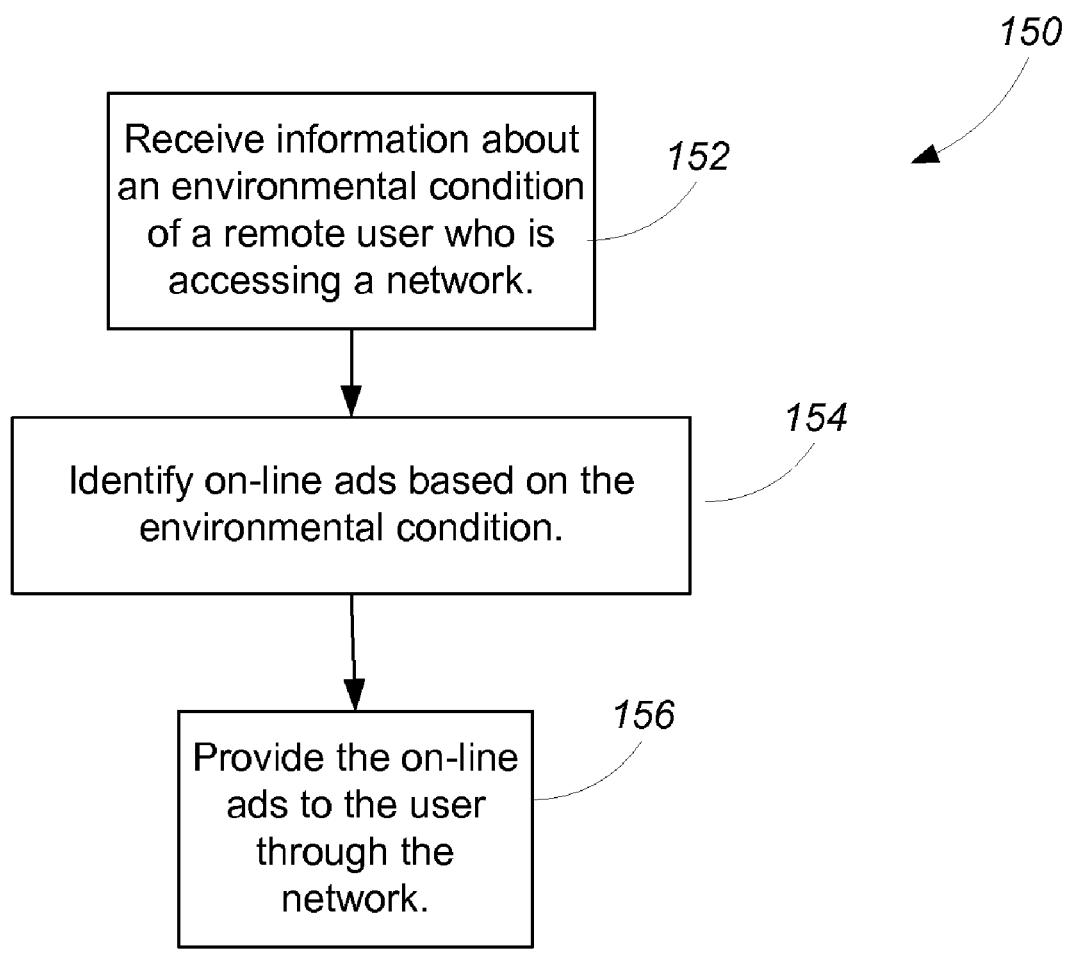
FIGS. 7 to 11 are flow diagrams of processes.

Referring to FIG. 7, an exemplary process 150 can be used for serving ads using environmental conditions as one of the criteria for selecting the ads. The process 150 receives information about an environmental condition of a remote user who is accessing a network (152). For example, the information can be generated by the sensors 114 and received by the search sever 106 (FIG. 1). The network can be the network 112. The environmental condition can be determined based on location information of the user. The location information of the user can be determined without using location information stored in a pre-established user profile. For example, the environmental condition determination engine 122 can be used to determine the environmental condition of the user based on the IP address of the user 104 or a registered residence address of the user 104.

The process 150 identifies on-line ads based on the environmental condition (154). For example, the ad server 116 may identify the on-line ads 102. The process 150 provides the on-line ads to the user through the network (156). For example, the system 100 can provide ads 102 to the user 104.

Figure 8:
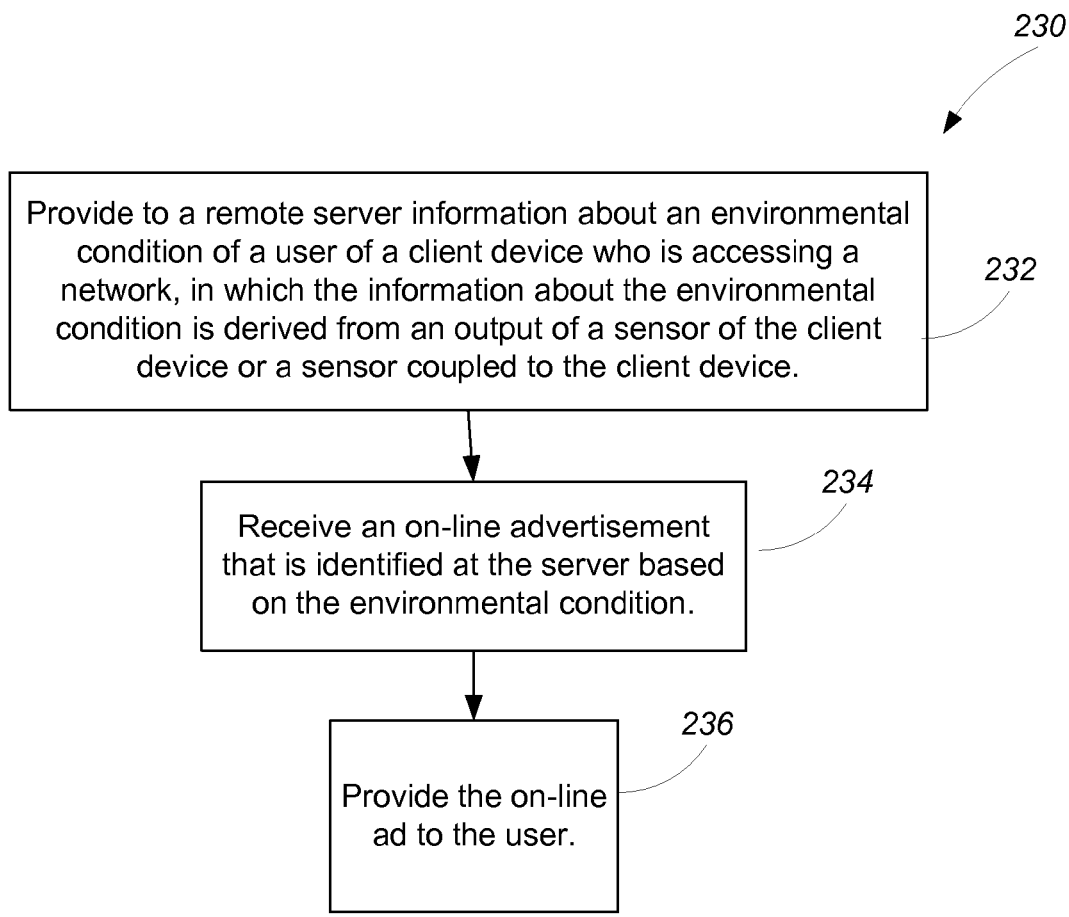

Referring to FIG. 8, an exemplary process 230 can be used for receiving ads that are identified based on environmental conditions. For example, a client device provides to a remote server information about an environmental condition of a user of the client device who is accessing a network, in which the information about the environmental condition is derived from an output of a sensor of the client device or a sensor coupled to the client device (232). For example, the client device can be the client terminal 110 (FIG. 1), and the remote server can be the ad server 116.

In some examples, the sensor can include an environmental sensor that provides information about the environmental condition. The environmental condition can include temperature, humidity, sound, light, air composition, location, or speed of movement. In some examples, the sensor includes a GPS sensor, and the process 230 includes identifying a geographical location of the user based on the sensor output and identifying information about the environmental condition of the geographical location.

The client device receives an on-line advertisement that is identified at the server based on the environmental condition (234). The client device provides the on-line advertisement to the user (236).

In some examples, the process 230 includes providing a keyword query from the user to the server, the keyword query including one or more keywords, and the on-line advertisement are selected by the server based on the one or more keywords and the environmental condition. In some examples, the process 230 provides a traffic condition of the user based on the information about the environmental condition, and the on-line advertisement is identified based on the traffic condition.

Figure 9:
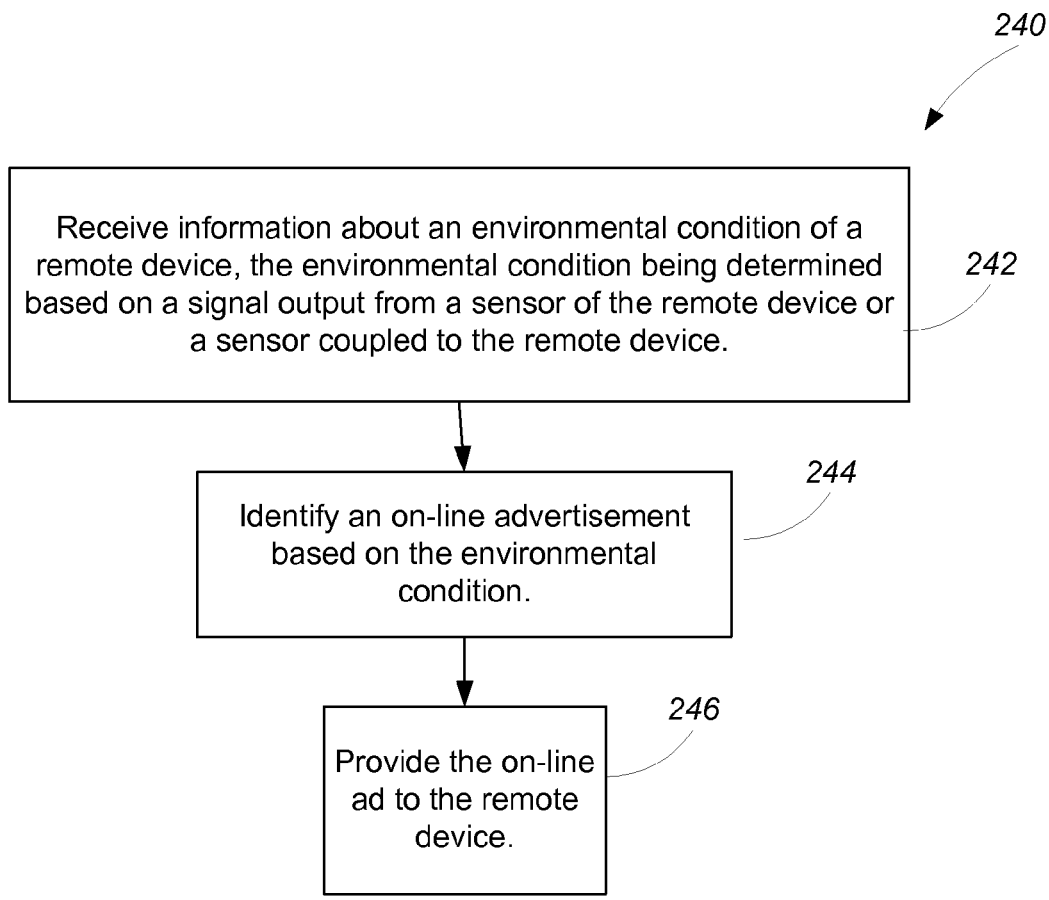

Referring to FIG. 9, an exemplary process 240 can be used for serving ads that are identified based on environmental conditions. Information about an environmental condition of a remote device are received, in which the environmental condition is determined based on a signal output from a sensor of the remote device or a sensor coupled to the remote device (242).

In some examples, an audio, image, or video signal is received from the sensor, and the environmental condition is determined based on the audio, image, or video signal. In some examples, the remote device is a mobile phone. An audio signal including a voice instruction from a user is received at the mobile phone. The environmental condition can be determined based on background sounds in the audio signal. An event can be determined based on the signal output from the sensor and location information. For example, the event can be a sports event or a musical event.

An on-line advertisement is identified based on the environmental condition (244). The on-line advertisement is provided to the remote device (246). In some examples, the remote device includes a visual or audio user interface. For example, the remote device can be a digital billboard, a digital kiosk, a vendor machine, or a public address system. A visual advertisement can be provided for displaying on a display of the digital billboard, digital kiosk, or vending machine. An audio advertisement can be provided for playing through an audio output of the digital billboard, digital kiosk, vending machine, or public address system.

Figure 10:
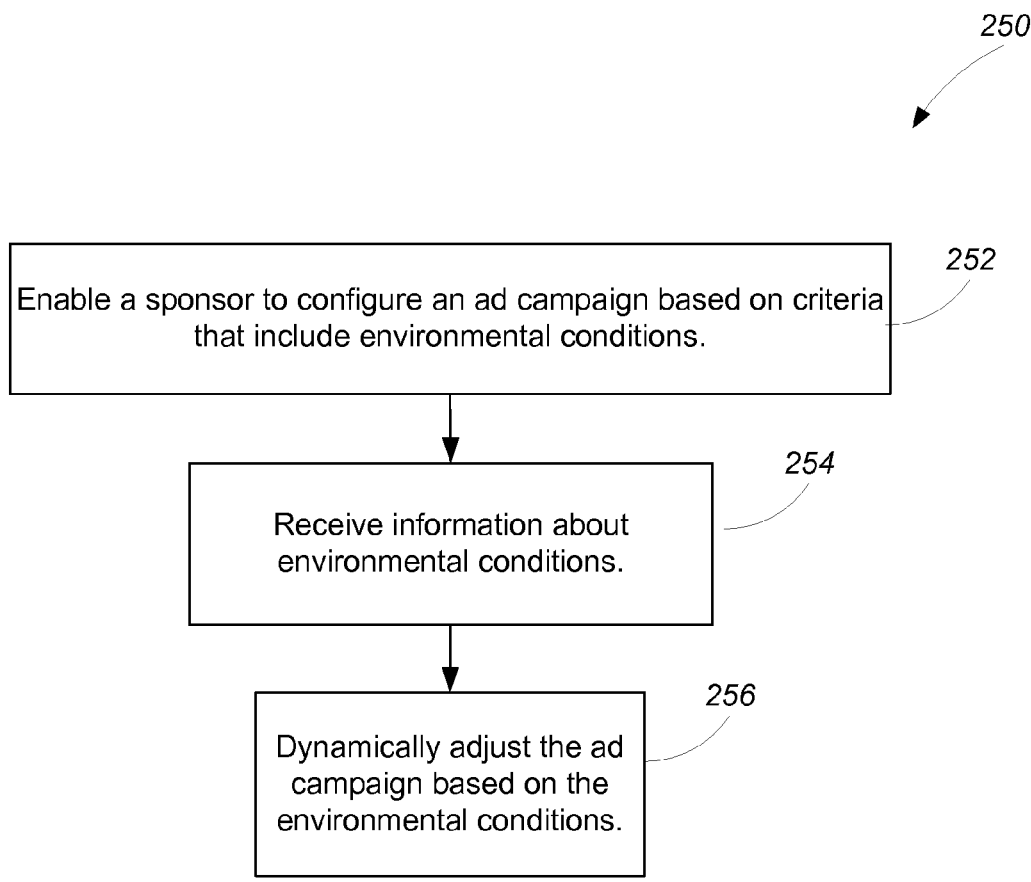

Referring to FIG. 10, an exemplary process 250 can be used configure ad campaigns. The process 250 enables a sponsor to configure an ad campaign based on criteria that include environmental conditions (252). For example, a user interface can be provided to the sponsor to allow the sponsor to specify different ad budgets for different environmental conditions. For example, the user interface may allow the sponsor specify how allocation of ad budgets for different types of media, bid amounts of ads for different types of media, allocation of ad budgets for different products, or bid amounts of ads for different products are adjusted based on the environmental conditions.

The process 250 includes receiving information about environmental conditions, and dynamically adjusting the ad campaign based on the environmental conditions. For example, the allocation of ad budgets for different types of media, the bid amounts of ads for different types of media, the allocation of ad budgets for different products, or the bid amounts of ads for different products can be adjusted based on the environmental conditions.

Figure 11:
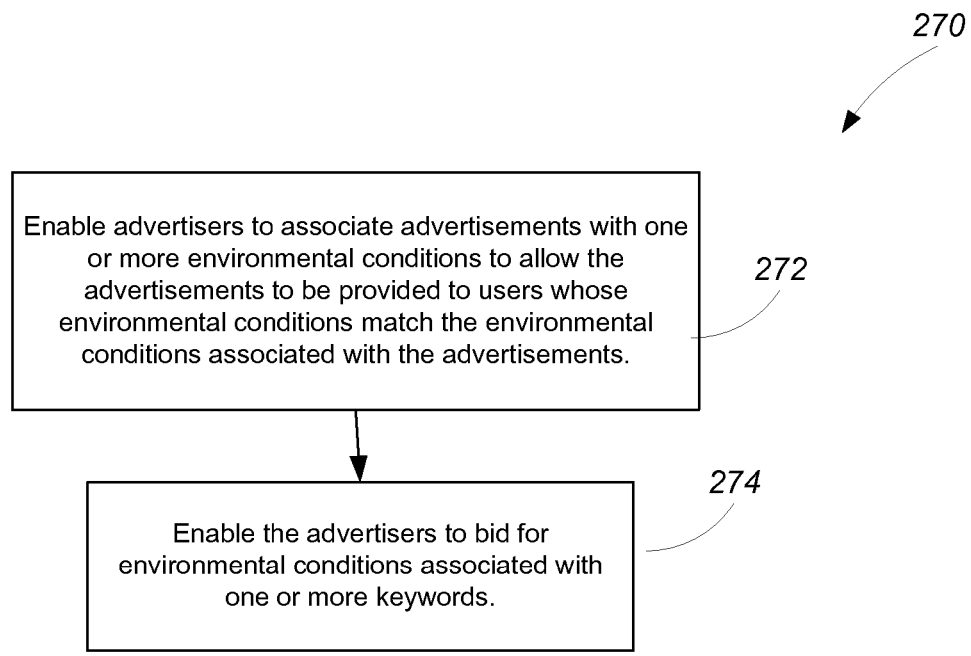

Referring to FIG. 11, an exemplary process 270 can be used configure ad campaigns. The process 270 enables advertisers to associate advertisements with one or more environmental conditions to allow the advertisements to be provided to users whose environmental conditions match the environmental conditions associated with the advertisements (272). The process enables the advertisers to bid for environmental conditions associated with one or more keywords (274).

For example, a user interface can be provided to allow the advertiser to associate the advertisement with the environmental condition. The user interface can be configured to allow the advertiser to bid for environmental conditions associated with one or more keywords. The environmental condition can include, for example, at least one of temperature, humidity, sound, light, air composition, location, and speed of movement.

Figure 12:
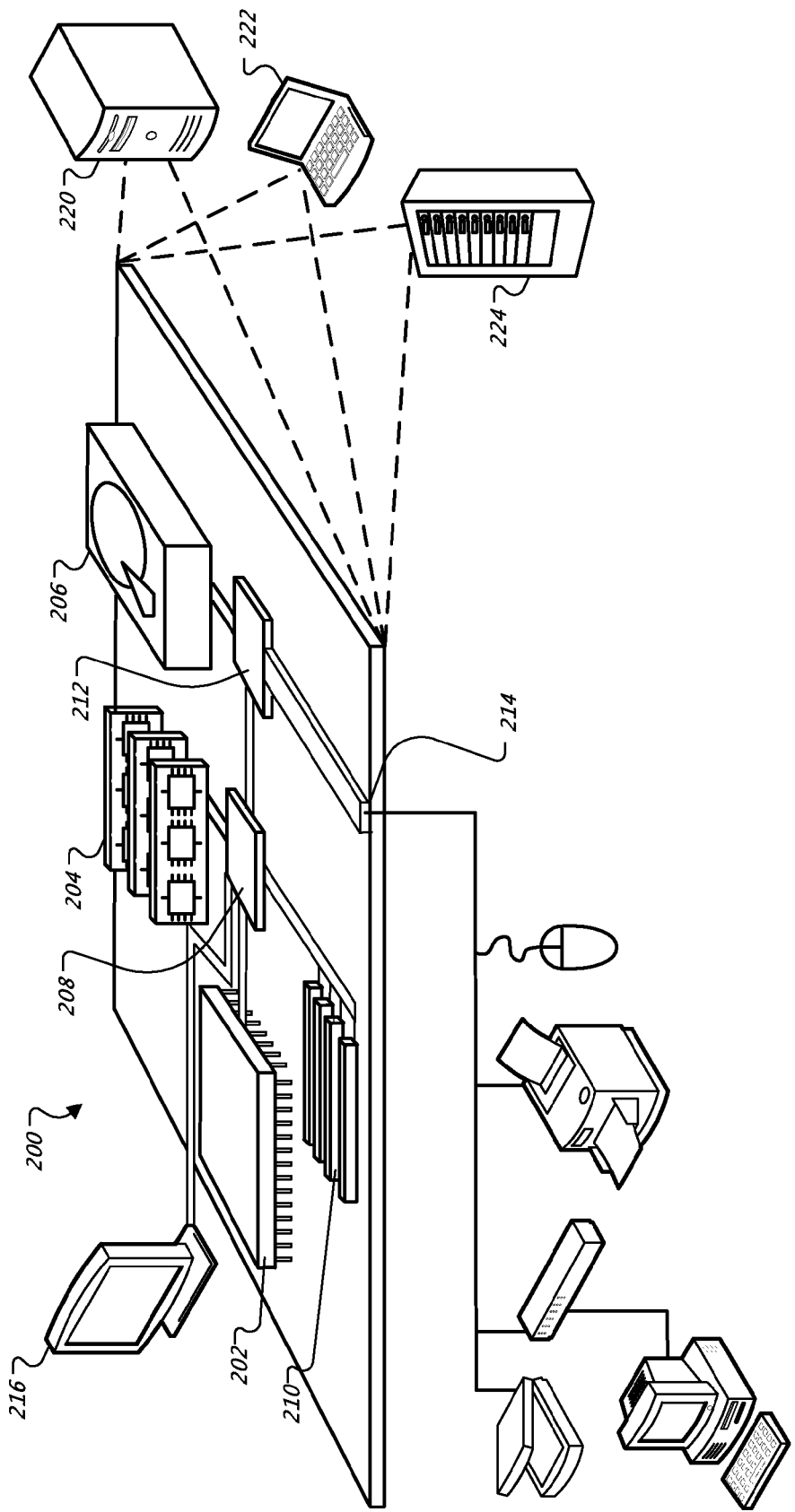
FIG. 12 is a schematic diagram of a general computing system.

FIG. 12 shows a schematic representation of a general computing system 200 that can be used to implement the system 100 or a component of the system 100, such as the ad server 116 or search server 106. Computing device 200 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 200 includes a processor 202, memory 204, a storage device 206, a high-speed interface 208 connecting to memory 204 and high-speed expansion ports 210, and a low speed interface 212 connecting to low speed bus 214 and storage device 206. Each of the components 202, 204, 206, 208, 210, and 212, are interconnected using various busses, and may be mounted on a common motherboard or in other manners as appropriate. The processor 202 can process instructions for execution within the computing device 200, including instructions stored in the memory 204 or on the storage device 206 to display graphical information for a GUI on an external input/output device, such as display 216 coupled to high speed interface 208. In other implementations, multiple processors and/or multiple buses may be used, as appropriate, along with multiple memories and types of memory. Also, multiple computing devices 200 may be connected, with each device providing portions of the necessary operations (e.g., as a server bank, a group of blade servers, or a multi-processor system).

The memory 204 stores information within the computing device 200. In one implementation, the memory 204 is a volatile memory unit or units. In another implementation, the memory 204 is a non-volatile memory unit or units. The memory 204 may also be another form of computer-readable medium, such as a magnetic or optical disk.

The storage device 206 is capable of providing mass storage for the computing device 200. In one implementation, the storage device 206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 204, the storage device 206, memory on processor 202, or a propagated signal.

The high speed controller 208 manages bandwidth-intensive operations for the computing device 200, while the low speed controller 212 manages lower bandwidth-intensive operations. Such allocation of functions is exemplary only. In one implementation, the high-speed controller 208 is coupled to memory 204, display 216 (e.g., through a graphics processor or accelerator), and to high-speed expansion ports 210, which may accept various expansion cards (not shown). In the implementation, low-speed controller 212 is coupled to storage device 206 and low-speed expansion port 214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 200 may be implemented in a number of different forms, as shown in the figure. For example, it may be implemented as a standard server 220, or multiple times in a group of such servers. It may also be implemented as part of a rack server system 224. In addition, it may be implemented in a personal computer such as a laptop computer 222. Each of such devices (e.g., standard server, rack server system, personal computer, laptop computer) may contain one or more of computing device 200, and an entire system may be made up of multiple computing devices 200 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications and methods have been described, it should be recognized that numerous other applications are contemplated.

User interfaces different from those described above can be used. Various types of sensors can be used. Ads can be selected based on information from a combination of sensors. The network 112 can be a local area network (LAN), a wide area network (WAN), any other type of network, or any combination of types of networks. The server 106, server 112, environmental condition determination engine 122, and index 118 may be integrated into a single device.

In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
   receiving, from a computing device, a search request comprising (i) information about a first environmental condition of the computing device, and (ii) one or more search terms;
   parsing the search request;
   selecting, from the search request based on parsing, the information about the first environmental condition;
   identifying an advertisement based on the first environmental condition and at least one of the one or more search terms;
   providing the advertisement to the computing device;
   receiving one or more of an audio signal, an image signal, or a video signal from a sensor of the computing device; and
   determining a second environmental condition based on the one or more of the audio signal, the image signal, or the video signal.

2. A computer-implemented method comprising:
   receiving, from a computing device, a search request comprising (i) information about a first environmental condition of the computing device, and (ii) one or more search terms;
   parsing the search request
   selecting, from the search request based on parsing, the information about the first environmental condition;
   identifying an advertisement based on the first environmental condition and at least one of the one or more search terms;
   providing the advertisement to the computing device;
   receiving an audio signal that comprises a voice instruction from a user of the computing device; and
   determining a second environmental condition based on background sounds in the audio signal.

3. The computer-implemented method of claim 2, further comprising providing information in addition to the advertisement to the computing device used by the user based on the voice instruction of the user.

4. The computer-implemented method of claim 1, wherein the computing device comprises a mobile phone.

5. The computer-implemented method of claim 1, wherein the computing device comprises one or more of a mobile phone, a personal computer, a digital billboard, a digital kiosk, or a vendor machine, and providing the advertisement to the computing device comprises providing a visual advertisement for displaying on a display of one or more of the mobile phone, the personal computer, the digital billboard, the digital kiosk, or the vending machine.

6. The computer-implemented method of claim 1, wherein the computing device comprises one or more of a mobile phone, a personal computer, a digital billboard, a digital kiosk, a vending machine, or a public address system, and providing the advertisement to the computing device comprises providing an audio advertisement for playing through an audio output of one or more of the mobile phone, the personal computer, the digital billboard, the digital kiosk, the vending machine, or the public address system.

7. The computer-implemented method of claim 1, further comprising identifying an event based on a signal output from a sensor of the computing device.

8. The computer-implemented method of claim 7, wherein the event comprises at least one of a sports event or a musical event.

9. The computer-implemented method of claim 7, wherein the advertisement is identified further based on the event.

10. The computer-implemented method of claim 1, further comprising placing the computing device in a public environment and sharing the computing device among a plurality of people.

11. The computer-implemented method of claim 10, further comprising providing information in addition to the advertisement from the computing device to the plurality of people.

12. The computer-implemented method of claim 11, wherein providing information comprises providing at least one of text information, audio information, or video information.

13. An apparatus comprising:
    one or more processing devices; and
    one or more machine-readable media configured to store instructions that are executable by the one or more processing devices to perform operations comprising:
       receiving, from a computing device, a search request comprising (i) information about a first environmental condition of the computing device, and (ii) one or more search terms;
       parsing the search request;
       selecting, from the search request based on parsing, the information about the first environmental condition;
       identifying an advertisement based on the first environmental condition and at least one of the one or more search terms;
       providing the advertisement to the computing device;
       receiving one or more of an audio signal, an image signal, or a video signal from a sensor of the computing device; and
       determining a second environmental condition based on the one or more of the audio signal, the image signal, or the video signal.

14. The apparatus of claim 13, wherein the computing device comprises at least one of a visual interface or an audio user interface.

15. The apparatus of claim 13, wherein the computing device comprises one or more of a mobile phone, a digital billboard, a digital kiosk, or a vending machine, and wherein the computing device is configured to receive visual advertisements from the one or more processing devices and to show the visual advertisements on a display of the computing device.

16. The apparatus of claim 13, wherein the computing device comprises one or more of a mobile phone, a digital billboard, a digital kiosk, a vending machine, or a public address system, and providing the advertisement to the computing device comprises providing an audio advertisement for playing through an audio output of the computing device.

17. The apparatus of claim 13, wherein a sensor of the computing device is configured to sense at least one of temperature, humidity, sound, light, or air composition.

18. One or more machine-readable media configured to store instructions that are executable by one or more processing devices to perform operations comprising:
    receiving, from a computing device, a search request comprising (i) information about a first environmental condition of the computing device, and (ii) one or more search terms;
    parsing the search request;
    selecting, from the search request based on parsing, the information about the first environmental condition;
    identifying an advertisement based on the first environmental condition and at least one of the one or more search terms;
    providing the advertisement to the computing device;

receiving one or more of an audio signal, an image signal, or a video signal from a sensor of the computing device; and determining a second environmental condition based on the one or more of the audio signal, the image signal, or the video signal.

19. One or more machine-readable media configured to store instructions that are executable by one or more processing devices to perform operations comprising:

receiving, from a computing device, a search request comprising (i) information about a first environmental condition of the computing device, and (ii) one or more search terms;

parsing the search request selecting, from the search request based on parsing, the information about the first environmental condition;

identifying an advertisement based on the first environmental condition and at least one of the one or more search terms;

providing the advertisement to the computing device;

receiving an audio signal that comprises a voice instruction from a user of the computing device; and determining a second environmental condition based on background sounds in the audio signal.

20. The one or more machine-readable media of claim 19, wherein the operations further comprise:

providing information in addition to the advertisement to the computing device used by the user based on the voice instruction of the user.

21. The one or more machine-readable media of claim 18, wherein the operations further comprise:

placing the computing device in a public environment;

sharing the computing device among a plurality of people; and providing information in addition to the advertisement from the computing device to the plurality of people.

22. The one or more machine-readable media of claim 18, wherein the computing device comprises one or more of a mobile phone, a personal computer, a digital billboard, a digital kiosk, or a vendor machine, and providing the advertisement to the computing device comprises providing a visual advertisement for displaying on a display of the computing device.

23. The one or more machine-readable media of claim 18, wherein the computing device comprises one or more of a mobile phone, a personal computer, a digital billboard, a digital kiosk, a vending machine, or a public address system, and providing the advertisement to the computing device comprises providing an audio advertisement for playing through an audio output of the computing device.

* * * * *

UNITED STATES PATENT AND TRADEMARK OFFICE
CERTIFICATE OF CORRECTION

PATENT NO.        : 8,138,930 B1
APPLICATION NO.   : 12/017613
DATED             : March 20, 2012
INVENTOR(S)       : Taliver Brooks Heath It is certified that error appears in the above-identified patent and that said Letters Patent is hereby corrected as shown below:

In Claim 2, Column 19, line 26, delete "request" and insert --request;--, therefor.

In Claim 19, Column 21, line 14, delete "request" and insert --request;--, therefor.

Signed and Sealed this
Fifteenth Day of May, 2012

David J. Kappos
*Director of the United States Patent and Trademark Office*